United States Patent [19]
Gen-Kuong et al.

[11] Patent Number: 5,997,360
[45] Date of Patent: Dec. 7, 1999

[54] AIRCRAFT EQUIPMENT CONFIGURATION IDENTIFICATION INTERFACE

[76] Inventors: Fernando Francisco Gen-Kuong, 28561 Murrelet Dr., Laguna Niguel, Calif. 92677; Alexis Gabriel Karolys, 302 Calle Paisano, San Clemente, Calif. 92673

[21] Appl. No.: 09/083,598

[22] Filed: May 22, 1998

Related U.S. Application Data

[63] Continuation-in-part of application No. 08/949,461, Oct. 14, 1997.

[51] Int. Cl.⁶ .................................................. H01R 13/703
[52] U.S. Cl. .......................................... 439/700; 439/955
[58] Field of Search .................................. 439/489, 188, 439/680, 681, 955, 700

[56] References Cited

U.S. PATENT DOCUMENTS

| | | | |
|---|---|---|---|
| 3,229,240 | 1/1966 | Harrison, Sr. et al. | 439/692 |
| 4,112,748 | 9/1978 | Walley | 73/118 |
| 4,410,230 | 10/1983 | SanMiguel | 439/682 |
| 4,488,240 | 12/1984 | Kapadia et al. | 702/56 |
| 4,608,650 | 8/1986 | Kapadia | 364/528.14 |
| 4,684,896 | 8/1987 | Weishaupt | 324/399 |
| 4,689,573 | 8/1987 | Hilmer | 324/380 |
| 4,915,639 | 4/1990 | Cohn | 439/955 |
| 4,935,846 | 6/1990 | Karolys et al. | 361/683 |
| 5,169,328 | 12/1992 | Johnson | 439/955 |
| 5,295,641 | 3/1994 | Kaptein | 244/1 |
| 5,491,418 | 2/1996 | Alfaro et al. | 324/402 |
| 5,496,196 | 3/1996 | Schachtebeck | 439/682 |
| 5,511,944 | 4/1996 | Ide et al. | 416/31 |
| 5,524,362 | 6/1996 | Quandt et al. | 439/955 |
| 5,551,649 | 9/1996 | Kaptein | 244/1 |
| 5,635,841 | 6/1997 | Taylor | 324/380 |

OTHER PUBLICATIONS

Kaster Hand Tools Catalog—Oct. 1, 1991.

*Primary Examiner*—Neil Abrams
*Attorney, Agent, or Firm*—Stetina Brunda Garred & Brucker

[57] ABSTRACT

In accordance with the present invention, an aircraft instrumentation interface for use with at least one electrically conductive mechanical key disposed in an interface connector and has an orientation specific to a particular type of aircraft equipment configuration. The interface is provided with a key engagement member which is formed to electrically engage the mechanical key for sensing the angular orientation of the mechanical key. The interface is further provided with an aircraft equipment configuration sensor for identifying the aircraft equipment configuration type in response to sensed orientation of the mechanical key and for generating an electrical signal in response to the identification of the orientation of the mechanical key.

28 Claims, 5 Drawing Sheets

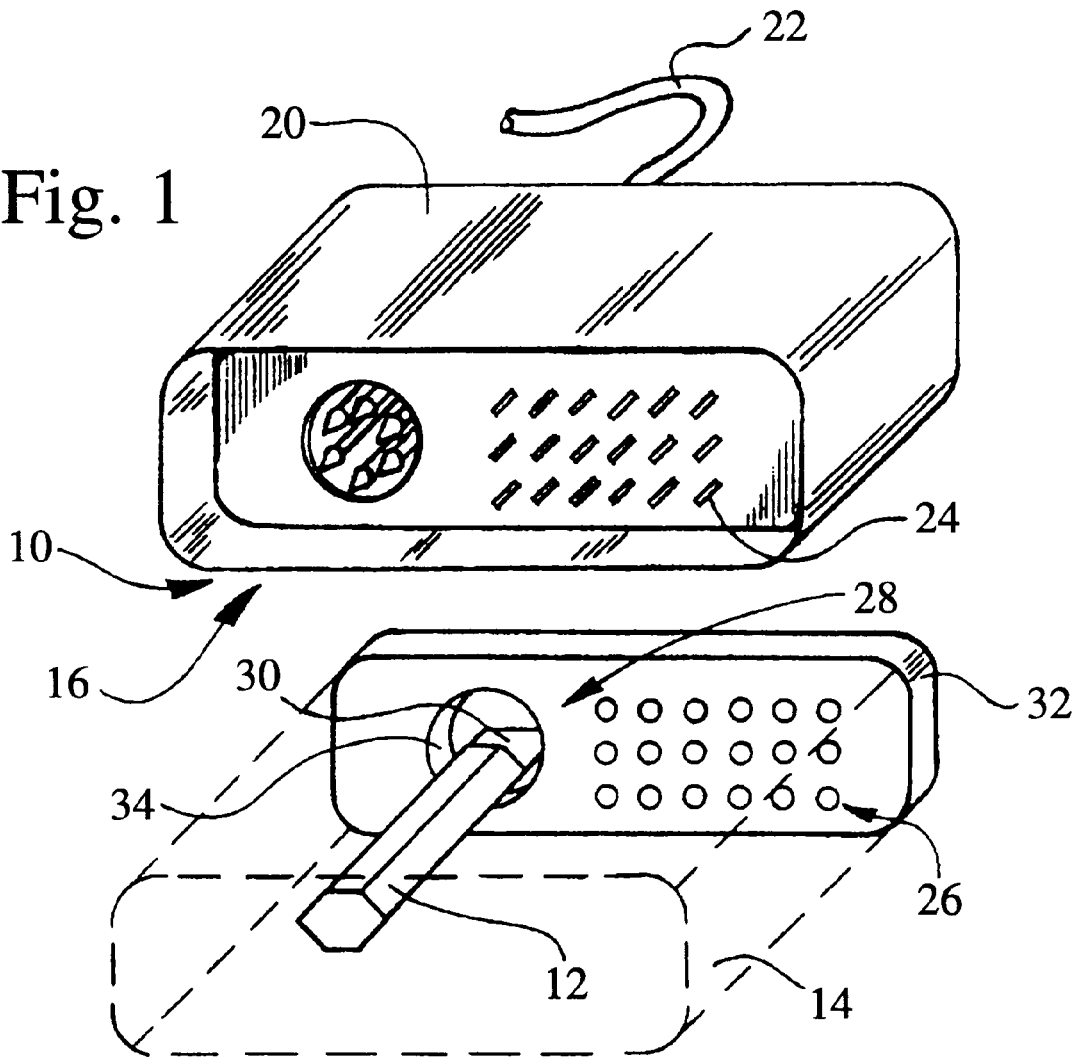

AIRCRAFT EQUIPMENT CONFIGURATION IDENTIFICATION INTERFACE

RELATED APPLICATIONS

This is a continuation-in-part application of U.S. patent application Ser. No. 08/949,461 filed on Oct. 14, 1997, entitled Vibration Monitoring System for Multiple Aircraft Engines, which is hereby incorporated by reference.

FIELD OF THE INVENTION

This invention generally relates to aircraft instrumentation interfaces, and in particular to an instrumentation interface which senses the mechanical characteristics of a mechanical key to identify the specific aircraft equipment configuration, such as the aircraft type and engine type configuration, connected thereto.

BACKGROUND OF THE INVENTION

The utilization of testing and monitoring instrumentation devices for usage with modern aircraft is a focus of consideration. This is especially the case in light of compliance with ever-changing and increasingly stringent governmental safety regulations. Such test instrumentation devices may be necessary to perform engine vibration analysis, for example. In addition, other devices may be used to test fuel systems, hydraulic pressure systems, avionics systems, on-board communications systems, environmental control systems, and all other aircraft systems and subsystems which are electrically or electro-mechanically tested and/or monitored.

Generally, a test instrumentation system would include a test instrumentation device and an apparatus to connect the device to an output from a sensor in the aircraft. For example, in the context of engine vibration analysis, an engine vibration analysis device, via an electrical cable harness, would be connected to an accelerometer located adjacent to an aircraft engine. It is contemplated that the test instrumentation device would perform test sequences based upon a variety of variables, which could include the specific aircraft type and model, and specific type and model of the relevant aircraft component parts, such as the engines. Thus, there must be provided a method of informing the test instrumentation device of the relevant information regarding these variables.

A variety of test instrumentation system configurations have been developed to provide the system with the relevant information regarding the particular equipment configuration, such as the aircraft type and engine type configuration, to allow it to perform the appropriate test sequence. For example, a conventional test instrumentation system configuration may employ a generic test instrumentation device which mates with an aircraft/engine type configuration specific insert unit containing the test specification data corresponding to that particular aircraft/engine type configuration. In the case of a portable test instrumentation device which is used for ground-based servicing of a variety of aircraft/engine type configurations, however, the user is burdened with the requirement of purchasing a variety of aircraft/engine type specific insert units.

Another conventional system approach employs a generic test instrumentation device which has a stored library of test specifications corresponding to a variety of aircraft equipment configurations. Such a generic test instrumentation device is provided with a selection device through which the operator inputs, for example, the aircraft/engine type configuration, thereby informing the test instrumentation device which set of test specifications to use for analysis. This selection device may be a dial with various settings corresponding to a given aircraft/engine type or a key pad which a user types in a specific code corresponding to a given aircraft/engine type. This system, however, is subject to user errors in correctly setting the system to the particular aircraft/engine type because of the nature of the selection device used. For example, where the system is used to service multiple aircraft/engines on the ground, each time the user services a different aircraft/engine, the user must input through the selection device which aircraft/engine type the system is connected to. In the case of a dial type selection device, the user is required to turn the dial to the setting corresponding to the appropriate aircraft/engine type. This task is subject to user error, as the user may be inattentive while setting the dial or may simply forget to change the setting of the dial completely. In the case of a key pad type selection device, the user is required to key-in code corresponding to a given aircraft/engine type. Similarly, this task is subject to user error, as the user may be inattentive while keying-in the appropriate aircraft/engine type code or may key-in the code from memory (which of course is fallible).

Another system approach employs a configuration having an aircraft/engine type specific test instrumentation device with aircraft/engine type specific data being integral to the device. In the case of a portable test instrumentation device which is used for ground-based servicing of a variety of aircraft/engine types, the user burdened with the requirement of purchasing numerous test instrumentation devices for each aircraft/engine type. Moreover, the test instrumentation device is the most expensive system component. In addition, regardless of whether the aircraft/engine type specific test instrumentation device is integral to an aircraft/engine or portable used to service a variety of aircraft/engines, this configuration requires a manufacturer to produce a multitude of different test instrumentation devices, rather than a single generic one. Such a manufacturing requirement imposes added product costs.

As a safety measure, it is customary for aircraft manufacturers to specify that the instrumentation interface for cables connectors, wire harnesses and other electronic connection devices are constructed in a manner which helps ensure that appropriate test instrumentation devices are connected to the aircraft/engine. Thus, to ensure that the appropriate test device is connected to an aircraft/engine, the instrumentation interface may be formed such that only the appropriate mating connectors are engaged. In practice, for example, a maintenance worker is physically prevented from connecting cable attached to a given aircraft/engine type to a test instrumentation device suited for a different aircraft/engine type.

A conventional arrangement for is to provide the interface with at least one mechanical guide key configured to guide interface engagement. In addition, the guide key is disposed in the connector interface having an orientation specific to a particular type of aircraft/engine. Further, multiple guide keys may be provided having a combination of orientations corresponding to a particular type of aircraft/engines. Thus, in the case of an electrical pin connector, where various pins of a pin connector are engaged with the corresponding female connector, a guide key may be disposed in a male connector (pin-side) to guide the pins into proper alignment with the corresponding female connector. The corresponding female connector would be provided with a key engagement member which is particularly oriented to engage the guide key. Thus, this arrangement prevents the engagement between non-corresponding connectors suited for two different aircraft/engine types.

It is therefore evident that there exists a need in the art for a system of connecting test instrumentation devices to a variety of aircraft equipment configurations, such that a connection interface is formed between a test instrumentation device and a corresponding aircraft and the instrumentation device is provided with the identity of the equipment type configuration that it is connected to, in order to perform an appropriate test sequence.

SUMMARY OF THE INVENTION

The present invention specifically addresses the above-mentioned deficiencies associated with the prior art. More particularly, in accordance with the present invention, an aircraft instrumentation interface for use with at least one electrically conductive mechanical key disposed in an interface connector and has an orientation specific to a particular type of aircraft equipment configuration. The interface is provided with a key engagement member which is formed to electrically engage the mechanical key for sensing the angular orientation of the mechanical key. The interface is further provided with an aircraft equipment configuration sensor for identifying the aircraft equipment configuration type in response to sensed orientation of the mechanical key and for generating an electrical signal in response to the identification of the orientation of the mechanical key. Furthermore, the interface of the present invention may itself comprise a connector which may be male or female in nature. Thus, the interface of the present invention functions to link with the interface connector which houses the mechanical key.

As used herein, aircraft equipment configuration includes, for example, a particular aircraft type and engine type combination and characteristics particular to such combination. Examples of other aircraft equipment configurations include those configurations relating to test fuel systems, hydraulic pressure systems, avionics systems, on-board communications systems, environmental control systems, and all other aircraft systems and subsystems which are electrically or electro-mechanically tested and/or monitored.

In the preferred embodiment of the present invention, the key engagement member is provided with at least one electrical contact surface. The electrical contact surface is defined by the orientation of the mechanical key when the key engagement member is engaged with the mechanical key. The aircraft equipment configuration sensor is in electrical communication with the electrical contact surface.

The key engagement member is further provided with at least one electrically conductive pin, although, it is preferable that multiple pins are provided. Each pin is deflectable with respect to the mechanical key when the mechanical key is engaged with the key engagement member. Such deflection facilitates electrical engagement of the mechanical key with the pin. In one embodiment of the present invention, each pin is provided with a shaft portion and a tip portion with the electrical contact surface disposed at the tip portion. The shaft portion and the tip portion of each pin is flexibly connected to each other via a spring. The spring may deflect so as to allow the tip portion to move relative to the shaft portion and thereby facilitate electrical engagement of the mechanical key with the tip portion when the mechanical key is engaged with the key engagement member. In another embodiment of the present invention, the tip portion itself comprises a spring which is flexibly attached to a shaft portion.

The aircraft equipment configuration sensor comprises identification circuitry which is in electrical communication with the electrical contact surface for identifying the position of the electrical contact surface and for generating an electrical signal in response to the identification of the position of the electrical contact surface. Included in the identification circuitry is a microprocessor which is formed to receive the electrical signal from the aircraft equipment configuration sensor for correlating the electrical signal to aircraft equipment configuration specific test sequence data.

In practice, for example, the mechanical key may have a hexagonal cross-section. When viewed end-wise, such a key would have six discernable sections and may be oriented in six orientations (at 60 degree intervals). The key engagement member may have six pins which correspond to each of the six sections of the mechanical key. Engagement of the mechanical key with the key engagement member is effectuated by the pins. The particular pins that make electrical contact with the mechanical key vary depending upon the specific orientation of the mechanical key. Those pins that electrically engage the mechanical key are read as a logical low (0) by the aircraft equipment configuration identification circuitry. The remaining pins are read as a logical high (1) by the aircraft equipment configuration identification circuitry. Each pin can be represented by a number from 0 to 6, where 0 represents no pin having contact, and 1 through 6 represent the position of the pin in relation to mechanical key orientation. The aircraft equipment configuration identification circuitry would identify 7 to the Nth power unique combinations of the orientations of the mechanical key via contact the pins, where N is the number of mechanical keys. Up to 343 unique combinations of the orientations of the mechanical keys can be identified if three mechanical keys are provided (7 to the Nth power).

In another embodiment of the present invention, the interface is used with a mechanical key having a geometry specific to a particular type of aircraft equipment configuration. The electrical contact surface is defined by the geometry of such a mechanical key when the key engagement member is engaged with the mechanical key. The aircraft equipment configuration sensor is provided with identification circuitry which is in electrical communication with the electrical contact surface for identifying the position of the electrical contact surface and for generating an electrical signal in response to the identification of the position of the electrical contact surface.

In addition, there is provided a method of identifying the type of aircraft equipment configuration connected to an instrumentation interface connector having an electrically conductive mechanical key having an orientation specific to a particular type of aircraft equipment configuration. The method begins with providing a key engagement member are described above. The orientation of the mechanical key is sensed by electrically engaging the mechanical key with the key engagement member. The method further provides for generating an electrical signal representative of the sensed orientation of the mechanical key. The electrical signal is correlated to aircraft equipment configuration specific test sequence data. In addition, in another embodiment of the method of the present invention, there is provided a method of identifying the type of aircraft equipment configuration connected to an instrumentation interface connector having an electrically conductive mechanical key having a geometry specific to a particular type of aircraft equipment configuration. The method includes sensing the geometry of the mechanical key by electrically engaging the mechanical key with the key engagement member.

Advantageously, where the aircraft instrumentation interface of the present invention is used in conjunction with a test instrumentation device to test a variety of aircraft having a variety of aircraft equipment configurations, user errors associated with configuring the system to analyze a particular aircraft equipment configuration are mitigated. The interface of the present invention is a "smart" interface, in that it facilitates automatic identification of the aircraft configuration to which it is connected. Thus, this configuration mitigates user error problems associated with those prior system configurations which employ a generic test instrumentation device with aircraft equipment configuration specific insert units, as well as those which require the user to manually set the system to access the specific aircraft equipment configuration specific data.

In addition, the system configuration of the present invention allows for a single generic test instrumentation device to be utilized for testing or monitoring a variety of aircraft equipment configurations. Testing and analysis of multiple aircraft equipment configuration types is achieved with a single generic test instrumentation device and the corresponding connecting cable with a connecting cable having the aircraft instrumentation interface of the present invention. Thus, where the user utilizes the system to service a variety of aircraft equipment configurations, the user needs only to purchase a single test instrumentation device and connecting cable having the interface of the present invention. Conveniently, the present invention allows a manufacturer to produce generic test instrumentation devices with various aircraft configuration specific data being pre-loaded therein. Thus, it is contemplated that such generic test instrumentation devices reduces the number of parts that the manufacturer and user track and identify.

Based upon the foregoing, the instrumentation interface guide of the present invention represents an advance of art.

BRIEF DESCRIPTION OF THE DRAWINGS

An illustrative and presently preferred embodiment of the invention is shown in the accompanying drawings in which:

FIG. 1 is a perspective view of an aircraft instrumentation interface of the present invention;

FIG. 2 is a perspective view of a connector (shown in partial shadow box) which houses a mechanical key for use with the interface of the present invention;

DETAILED DESCRIPTION OF THE PREFERRED EMBODIMENT

Figure 3:
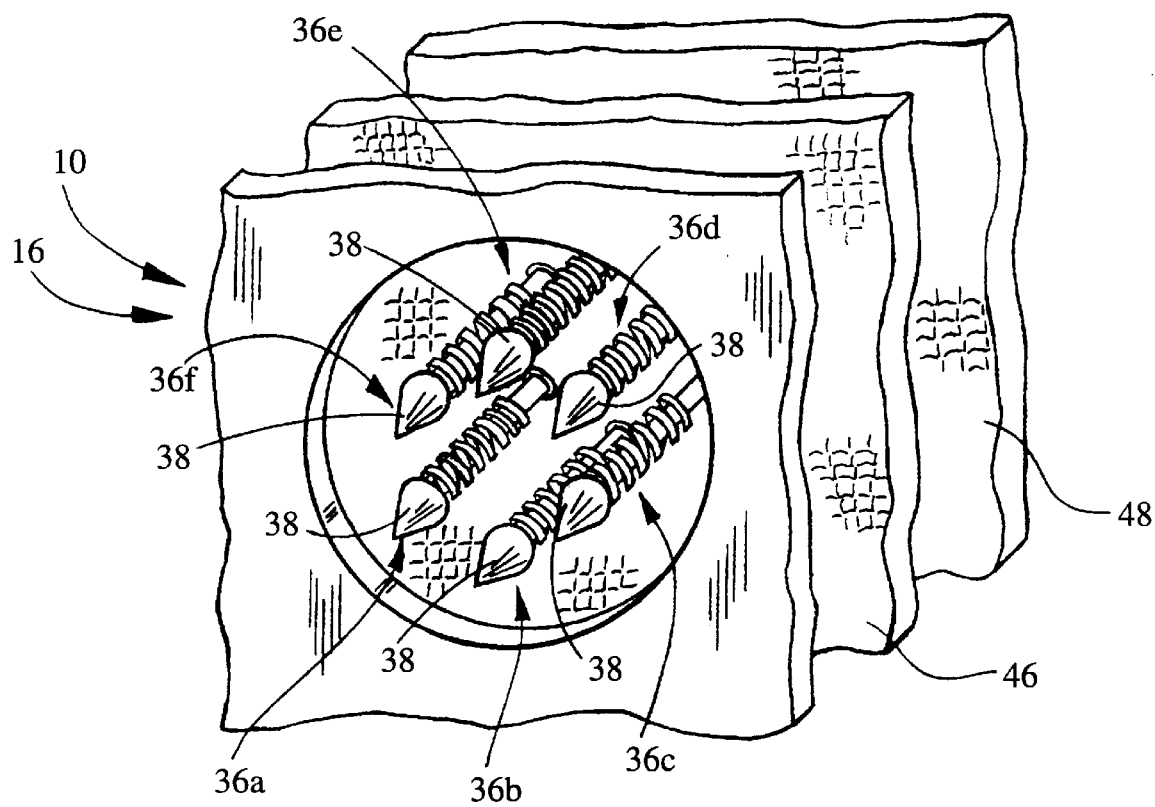
FIG. 3 is an exploded perspective view of a key engagement member of the interface shown in FIG. 1.

Referring now to the drawings wherein in the showings are for purposes of illustrating a preferred embodiment of the present invention only, and not for purposes of limiting the same, FIGS. 1–8 illustrate an aircraft instrumentation interface constructed in accordance with the present invention.

The present invention specifically addresses the above-mentioned deficiencies associated with the prior art. More particularly, in accordance with the present invention, an aircraft instrumentation interface 10 for use with at least one electrically conductive mechanical key 12 disposed in an interface connector 14 and has an orientation specific to a particular type of aircraft equipment configuration. The interface 10 is provided with a key engagement member 16 which is formed to electrically engage the mechanical key 12 for sensing the angular orientation of the mechanical key 12. The interface 10 is further provided with an aircraft equipment configuration sensor 18 for identifying the aircraft equipment configuration type in response to sensed orientation of the mechanical key 12 and for generating an electrical signal in response to the identification of the orientation of the mechanical key 12. Furthermore, the interface 10 of the present invention may itself comprise a cable connector 20 which may be male or female in nature. Thus, the interface 10 of the present invention functions to link with the interface connector 14 which houses the mechanical key 12.

As used herein, aircraft equipment configuration includes, for example, a particular aircraft type and engine type combination and characteristics particular to such combination. Examples of other aircraft equipment configurations include those configurations relating to test fuel systems, hydraulic pressure systems, avionics systems, on-board communications systems, environmental control systems, and all other aircraft systems and subsystems which are electrically or electro-mechanically tested and/or monitored.

Referring now to FIG. 1, there is depicted an aircraft testing cable 22 with the cable connector 20 attached thereto. The cable connector 20 is provided with a plurality of data pins 24. Referring now to FIG. 2, there is depicted the interface connector 14 as shown in a partial shadow box. The mechanical key 12 is disposed and housed within the interface connector 14. The interface connector 14 is further provided with a plurality of pin receiving holes 26, each of which correspond to respective ones of the plurality of data pins 24.

It is contemplated that the interface connector 14 is disposed within or connected to an aircraft having a particular equipment configuration. It is further contemplated that the mechanical key 12 has an orientation specific to a particular aircraft equipment configuration. As can be seen, the mechanical key 12 has a hexagonal cross-section. Thus, when viewed end-wise, the mechanical key 12 has six discernible triangular sections. Furthermore, the mechanical key may be oriented in 6 orientations (at 60-degree intervals). The mechanical key 12 as seen in FIGS. 2–6, is provided with an engagement end 28. The engagement end 28 is provided with a partial extension portion 30 having a cross-section equal to half of the cross-section of the rest of the mechanical key 12. As such, the partial extension portion 30 represents an extension of three of the six discernible sections which correspond to each of the 60-degree sections. It is contemplated that the geometry of the engagement end 28 of the mechanical key 12 as represented by the partial extension portion 30 provides physical or mechanical information regarding the orientation of the mechanical key 12. Thus, the particular orientation of the mechanical key 12, as seen in FIGS. 2–6, represents a particular aircraft configuration which is connected to interface connector 14. The aircraft testing cable 22 is contemplated to be connected to an aircraft testing or monitoring device (not shown). As such, it is contemplated that data may be passed from the interface connector 14 to the cable connector 20 and ultimately to such a testing or monitoring device.

Referring now to FIG. 3, there is depicted an exploded perspective view of a portion of the interface connector 14 as shown in FIG. 1. The interface connector 14 is provided with a face plate 32. The face plate 32 is provided with an access aperture 34. As can be seen, the access apeture 34 is configured to align with the mechanical key of the interface connector 14 when the interface connector 14 is engaged with the cable connector 20.

In the preferred embodiment of the present invention, the key engagement member takes the form of a plurality of electrically conductive pins 36a–f. As can be seen, the pins 36a–f are disposed in a hexagonal pattern and are spaced at 60-degree intervals so as to correspond to the six sections of the mechanical key 12. Each of the pins 36a–f are formed to be deflectable with respect to the mechanical key 12 when the mechanical key 12 is engaged with the key engagement member 16. It is contemplated that such deflection facilitates electrical engagement of the mechanical key with the various pins 36a–f.

Referring now to FIGS. 4–7, there is depicted the mechanical key 12 which is engaged, both mechanically and electrically, with the key engagement member 16. The pins 36a–c are shown to be in contact with the partial extension portion 30 of the mechanical key 12. The pins 36d–f are shown to be not in engagement with any portion of the mechanical key 12.

In the preferred embodiment of the present invention, the pins 36a–f are each provided with a tip portion 38 and a shaft portion 40. Each of the respective tip portions 38 are flexibly connected to the respective shaft portions 40 via a spring 42. It is contemplated that the springs 42 facilitate deflection or movement of the respective tip portions 38 relative to their associated shaft portions 40. Importantly, the tip portions 38, the springs 42, and the shaft portions 40 of the key engagement member 16 are all formed of an electrically conductive material. Suitable material selection of these component parts are contemplated to be chosen from those well known to one of ordinary skill in the art.

Figure 4:
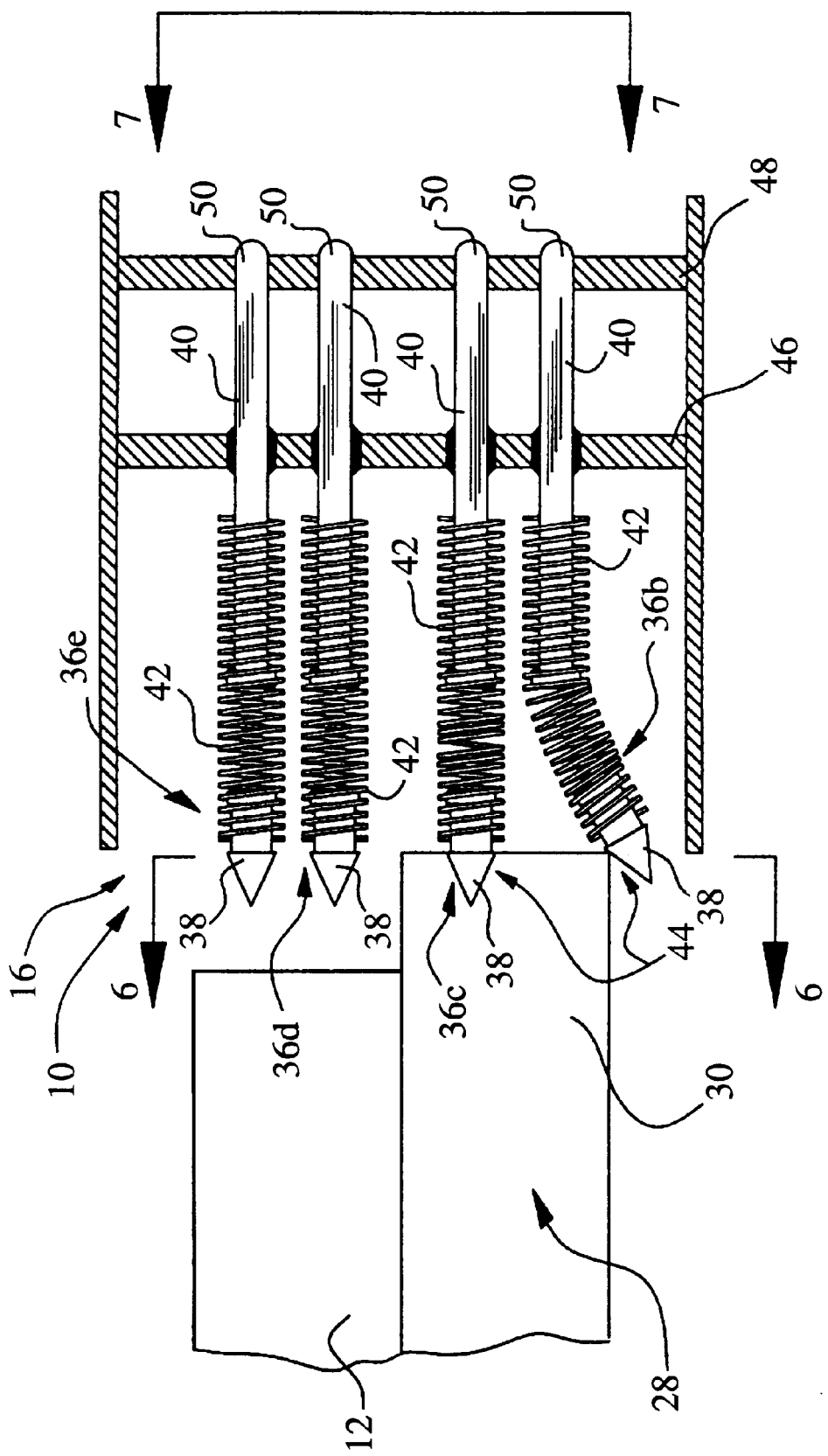
FIG. 4 is cross-sectional side view of a mechanical key engaged with the interface of the present invention.
Figure 5:
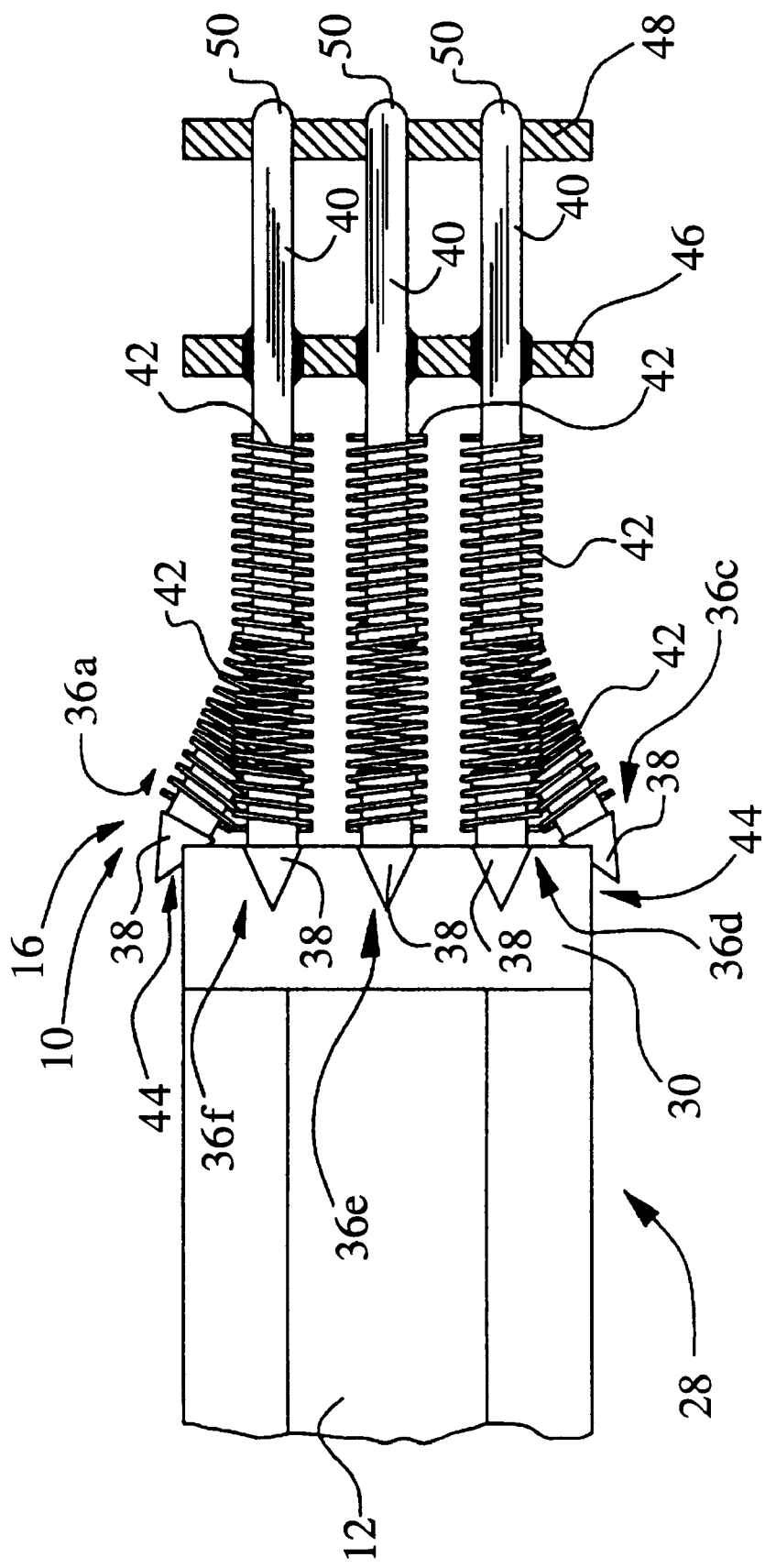
FIG. 5 is a cross-sectional top view of the mechanical key and interface shown in FIG. 4.
Figure 6:
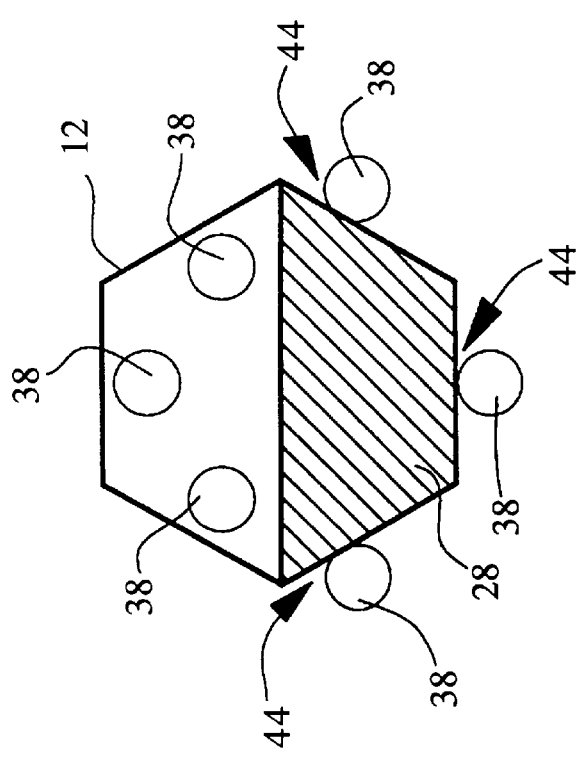
FIG. 6 is a cross-sectional view of the mechanical key and interface as seen along axis 6—6 of FIG. 5.

The key engagement member is provided with at least one electrical contact surface 44. The electrical contact surface 44 is defined by the orientation of the mechanical key 12 when the key engagement member 16 is engaged with the mechanical key 12. Referring now to FIGS. 4–6, the electrical contact surface 44 of the key engagement member 16 is disposed at the tip portions 38 of pins 36a–c. As such, the electrical contact surface in the configuration as shown in FIGS. 4–6 takes the form of three surfaces or engagement points which are respectively defined by the engagement between the tip portions 38 of the pins 36a–c with the partial extension portion 30 of the mechanical 12. Accordingly, it is contemplated that if the orientation of the mechanical key 12 is varied, then the electrical contact surface 44 is likewise varied, as interaction with different pins 36a–f are engaged with the partial extension portion 30.

As mentioned above, the springs 42 flexibly connect the tip portions 38 to the shaft portions 40 of the pins 36a–f. It is contemplated that such flexibility or deformability of the respective tip portions 38 facilitate good electrical contact or engagement with the partial extension portion 30 when the mechanical key 12 is engaged with the key engagement member 16. Thus, slight positional variations of the mechanical key 12 with respect to the key engagement member 16 may not necessarily disengage electrical contact between the two.

It is preferable that the pins 36a–f are supported by a first dielectric board 46, as seen in FIGS. 4 and 5. In addition, the pins 36a–f are further supported by a second dielectric board 48. Each of the shaft portions 40 of the pins 36a–f are provided with a terminal end 50. Each of the terminal ends are connected to the second dielectric board 48.

Figure 7:
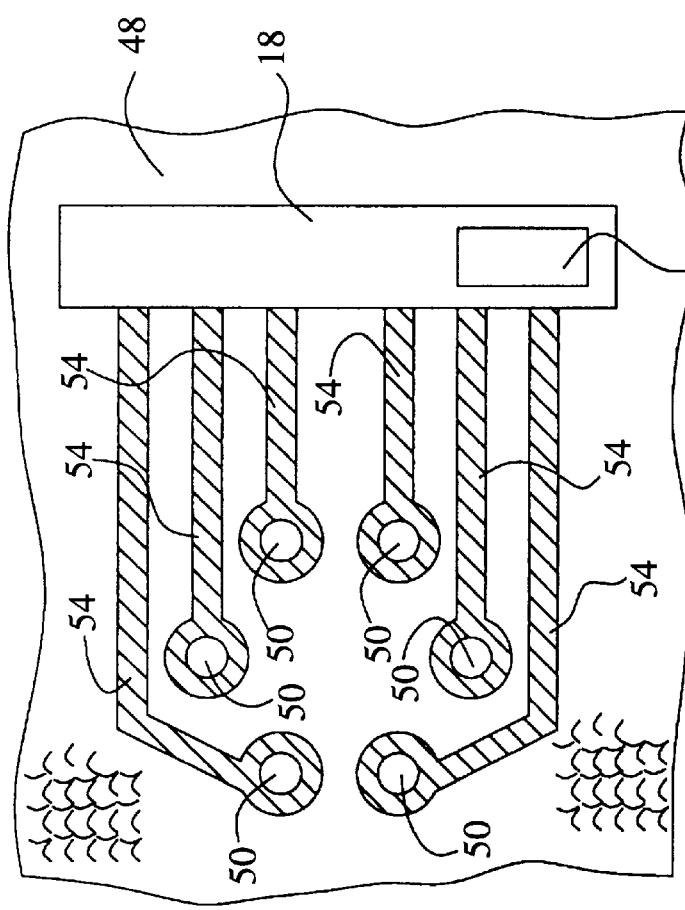
FIG. 7 is a cross-sectional view of the terminal ends of the pins as seen along axis 7—7 of FIG. 5.

Referring now to FIG. 7, there is depicted an end view of the terminal ends 50 of the pins 36a–f as seen along axis 7—7 of FIG. 4. In the preferred embodiment of the present invention, the aircraft equipment configuration sensor 18 is provided with identification circuitry 52 as shown symbolically in the figure. The aircraft configuration circuitry 52 is in electrical communication with the terminal ends 50 via trace leads 54. As such, it is contemplated that the aircraft equipment configuration circuitry 52 may electrically communicate with the partial extension portion 30 of the mechanical key 12 when the mechanical key 12 is engaged with the key engagement member 16. In this respect, as depicted in FIGS. 4–7, the aircraft equipment configuration circuitry 52 is in electrical communication with the partial extension portion 30 via pins 36a–c.

In practice, those pins 36a–f that electrically engage the mechanical key 12 are read as a logical low (0) by the aircraft equipment configuration circuitry 52. The remaining pins 36a–f are read as a logical high (1) by the aircraft equipment configuration identification circuitry 52. Each pin 36a–f can be represented by a number from 0 to 6, where 0 represents no pin 36a–f having contact, and 1–6 represent the position of the particular pin 36a–f in relation to the orientation of the mechanical key 12. The aircraft equipment configuration circuitry 52 would thus identify 7 to the Nth power unique combinations of the orientations of the mechanical key 12 via contact the pins 36 a–f, where N is the number of mechanical keys 12. It is contemplated that multiple mechanical keys may be incorporated into the interface connector 14 and therefore multiple key engagement members 16 would be required. Up to 343 unique combinations of the orientations of the mechanical keys 12 can be identified if three such mechanical keys 12 are provided (7 to the Nth power).

Based upon the foregoing, the aircraft instrumentation interface 10 of the present invention may be characterized as a "smart" interface, in that it facilitates automatic identification of the particular aircraft configuration to which it is connected. Thus, testing or monitoring devices which are connected to the cable connector 20 are provided with the necessary identification of the particular aircraft configuration to which the interface connector 14 is linked to. As described above, the key engagement member 16 operates to identify the orientation of the mechanical key 12. In another embodiment of the present invention, the aircraft instrumentation interface 10 is used with a mechanical key having a geometry specific to a particular type of aircraft equipment configuration. The electrical contact surface 44 is defined by the geometry of such a mechanical key 12 when the key engagement member 16 is engaged with the mechanical key 12. The aircraft equipment configuration sensor 18 is provided with aircraft equipment configuration circuitry 52 which is in electrical communication with the electrical contact surface 44 for identifying the position of the electrical contact surface 44 and for generating an electrical signal in response to the identification of the position of the electrical contact surface 44.

Figure 8:
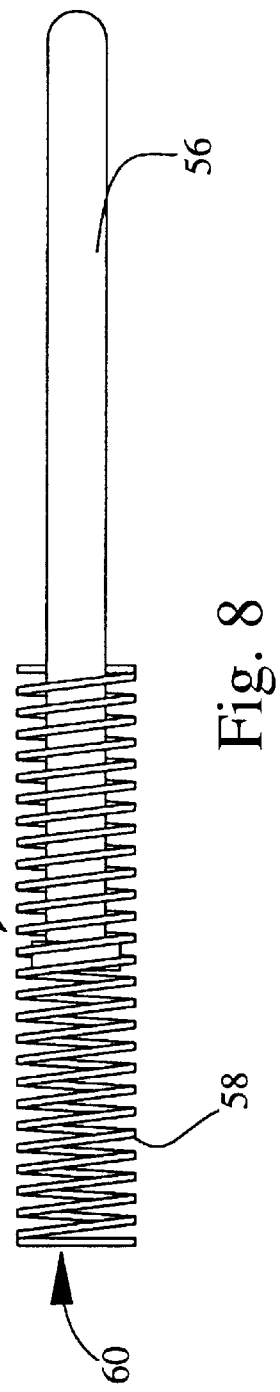
FIG. 8 is a side view of another embodiment of a pin of a key engagement member used in the interface of the present invention.

In addition, referring now to FIG. 8, there is provided another embodiment of the pin 36 used in the present invention. The pin 36 may be provided with a shaft portion 56 and a spring portion 58. The spring portion 58 is flexibly connected to the shaft portion 56. The spring portion 58 is provided with an engagement end 60 which is formed to electrically engage the mechanical key 12. Thus, it is contemplated that when the pin 36 is engaged with the mechanical key 12 the electrical contact surface 44 is formed at the engagement end 60 of the spring portion 58.

In addition, there is provided a method of identifying the type of aircraft equipment configuration connected to an instrumentation interface connector having an electrically conductive mechanical key having an orientation specific to a particular type of aircraft equipment configuration. The method begins with providing a key engagement member 16 as described above. Next, the orientation of the mechanical key 12 is sensed by electrically engaging the mechanical key 12 with the key engagement member 16. The method further provides for generating an electrical signal representative of the sensed orientation of the mechanical key 12. The electrical signal is correlated to aircraft equipment configuration specific test sequence data. In addition, in another embodiment of the method of the present invention, there is provided a method of identifying the type of aircraft equipment configuration connected to an instrumentation interface connector having an electrically conductive mechanical key having a geometry specific to a particular type of aircraft equipment configuration. The method includes sensing the geometry of the mechanical key 12 by electrically engaging the mechanical key 12 with the key engagement member 16 as described above.

Additional modifications and improvements of the present invention may also be apparent to those of ordinary skill in the art. Thus, the particular combination of parts described and illustrated herein is intended to represent only one embodiment of the present invention, and is not intended to serve as limitations of alternative devices within the spirit and scope of the invention.

What is claimed is:

1. An aircraft instrumentation interface, used with at least one electrically conductive mechanical key disposed in an interface connector, the mechanical key having an orientation specific to a particular type of aircraft equipment configuration, the interface comprising:

a key engagement member formed to electrically engage the mechanical key for sensing the angular orientation of the mechanical key; and an aircraft equipment configuration sensor for identifying the aircraft equipment configuration type in response to sensed orientation of the mechanical key and for generating an electrical signal in response to the identification of the orientation of the mechanical key.

2. The interface of claim 1 wherein the key engagement member comprises at least one electrical contact surface, the electrical contact surface defined by the orientation of the mechanical key when the key engagement member is engaged with the mechanical key, the aircraft equipment configuration sensor being in electrical communication with the electrical contact surface.

3. The interface of claim 2 wherein the key engagement member further comprises at least one electrically conductive pin.

4. The interface of claim 3 wherein the at least one electrically conductive pin comprises multiple pins.

5. The interface of claim 3 wherein the pin being deflectable with respect to the mechanical key when the mechanical key is engaged with the key engagement member for facilitating electrical engagement of the mechanical key with the pin.

6. The interface of claim 3 wherein each pin having a shaft portion and a tip portion with the electrical contact surface disposed thereat.

7. The interface of claim 6 wherein the shaft portion and the tip portion of each pin being flexibly connected to each other, deflection of the tip portion relative to the shaft portion facilitates electrical engagement of the mechanical key with the tip portion when the mechanical key is engaged with the key engagement member.

8. The interface of claim 7 wherein each pin further comprises a spring flexibly connecting the shaft portion and the tip portion to each other, deflection of the spring facilitates deflection of the tip portion relative to the shaft portion facilitates electrical engagement of the mechanical key with the tip portion when the mechanical key is engaged with the key engagement member.

9. The interface of claim 7 wherein the tip portion comprises a spring, deflection of the tip portion relative to the shaft portion facilitates electrical engagement of the mechanical key with the tip portion when the mechanical key is engaged with the key engagement member.

10. The interface of claim 2 wherein the aircraft equipment configuration sensor comprises identification circuitry in electrical communication with the electrical contact surface for identifying the position of the electrical contact surface and for generating an electrical signal in response to the identification of the position of the electrical contact surface.

11. The interface of claim 1 wherein the identification circuitry comprises a microprocessor formed to receive the electrical signal from the aircraft equipment configuration sensor for correlating the electrical signal to aircraft equipment configuration specific test sequence data.

12. The interface of claim 1 wherein the interface comprises a connector.

13. The interface of claim 12 wherein the interface comprises a female connector.

14. The interface of claim 1 wherein the mechanical key further having a geometry specific to a particular type of aircraft equipment configuration, wherein the key engagement member comprises at least one electrical contact surface, the electrical contact surface defined by the geometry of the mechanical key when the key engagement member is engaged with the mechanical key, the aircraft equipment configuration sensor being in electrical communication with the electrical contact surface.

15. The interface of claim 14 wherein the aircraft equipment configuration sensor comprises identification circuitry in electrical communication with the electrical contact surface for identifying the position of the electrical contact surface and for generating an electrical signal in response to the identification of the position of the electrical contact surface.

16. An aircraft instrumentation interface, used with at least one electrically conductive mechanical key disposed in an interface connector, the mechanical key having a geometry specific to a particular type of aircraft equipment configuration, the interface comprising:

a key engagement member formed to electrically engage the mechanical key for sensing the geometry of the mechanical key; and an aircraft equipment configuration sensor for identifying the aircraft equipment configuration type in response to sensed geometry of the mechanical key and for generating an electrical signal in response to the identification of the geometry of the mechanical key.

17. The interface of claim 16 wherein the key engagement member comprises at least one electrical contact surface, the electrical contact surface defined by the geometry of the mechanical key when the key engagement member is engaged with the mechanical key, the aircraft equipment configuration sensor being in electrical communication with the electrical contact surface.

18. The interface of claim 17 wherein the key engagement member further comprises at least one electrically conductive pin.

19. The interface of claim 18 wherein the aircraft equipment configuration sensor comprises identification circuitry in electrical communication with the electrical contact surface for identifying the position of the electrical contact surface and for generating an electrical signal in response to the identification of the position of the electrical contact surface.

20. A method of identifying the type of aircraft equipment configuration connected to an instrumentation interface connector having an electrically conductive mechanical key, the mechanical key having an orientation specific to a particular type of aircraft equipment configuration, the method comprising the steps of:

(a) providing a key engagement member formed to electrically engage the mechanical key; and (b) sensing the orientation of the mechanical key by electrically engaging the mechanical key with the key engagement member.

21. The method of claim 20 wherein the key engagement member comprises at least one electrical contact surface defined by the orientation of the mechanical key when the key engagement member is engaged with the mechanical key, wherein step (b) the orientation of the mechanical key is sensed by identifying of the position of the electrical contact surface.

22. The method of claim 21 further comprising the step of:

(c) generating an electrical signal representative of the sensed orientation of the mechanical key corresponding to a particular type of aircraft equipment configuration.

23. The method of claim 22 further comprising the step of:

(d) correlating the electrical signal to aircraft equipment configuration specific test sequence data.

24. The method of claim 20 wherein the mechanical key further having a geometry specific to a particular type of aircraft equipment configuration, wherein the key engagement member comprises at least one electrical contact surface defined by the geometry of the mechanical key when the key engagement member is engaged with the mechanical key.

25. A method of identifying the type of aircraft equipment configuration connected to an instrumentation interface connector having an electrically conductive mechanical key, the mechanical key having a geometry specific to a particular type of aircraft equipment configuration, the method comprising the steps of:

(a) providing a key engagement member formed to electrically engage the mechanical key; and (b) sensing the geometry of the mechanical key by electrically engaging the mechanical key with the key engagement member.

26. The method of claim 25 wherein the key engagement member comprises at least one electrical contact surface defined by the geometry of the mechanical key when the key engagement member is engaged with the mechanical key, wherein step (b) the geometry of the mechanical key is sensed by identifying of the position of the electrical contact surface.

27. The method of claim 26 further comprising the step of:

(c) generating an electrical signal representative of the sensed geometry of the mechanical key corresponding to a particular type of aircraft equipment configuration.

28. The method of claim 27 further comprising the step of:

(d) correlating the electrical signal to aircraft equipment configuration specific test sequence data.

* * * * *